(12) United States Patent
Paganini

(10) Patent No.: US 8,435,039 B2
(45) Date of Patent: May 7, 2013

(54) ADJUSTABLE PITCH SIMULATED ROOF FOR TRAINING FIREFIGHTERS IN ROOF VENTILATION PROCEDURES

(76) Inventor: Jeffrey Paganini, Sonoma, CA (US)

( * ) Notice: Subject to any disclaimer, the term of this patent is extended or adjusted under 35 U.S.C. 154(b) by 302 days.

(21) Appl. No.: 12/969,486

(22) Filed: Dec. 15, 2010

(65) Prior Publication Data

US 2011/0143324 A1 Jun. 16, 2011

Related U.S. Application Data

(60) Provisional application No. 61/286,704, filed on Dec. 15, 2009.

(51) Int. Cl.
  *G09B 19/00* (2006.01)
(52) U.S. Cl.
  USPC ............................................. 434/226
(58) Field of Classification Search ............ None
  See application file for complete search history.

(56) References Cited

U.S. PATENT DOCUMENTS

| | | | | |
|---|---|---|---|---|
| 4,526,548 A | * | 7/1985 | Livingston | 434/226 |
| 5,752,835 A | * | 5/1998 | Whitmer, Sr. | 434/226 |
| 6,358,057 B1 | * | 3/2002 | Bishop | 434/226 |
| 6,877,988 B2 | * | 4/2005 | Phillips et al. | 434/226 |
| 6,889,473 B2 | * | 5/2005 | Westra | 52/64 |
| 7,008,230 B2 | * | 3/2006 | Hoglund | 434/236 |
| 7,074,043 B1 | * | 7/2006 | Jacobson | 434/226 |
| 8,061,087 B2 | * | 11/2011 | Ray | 52/90.2 |
| 8,167,365 B2 | * | 5/2012 | Geurts et al. | 296/223 |
| 2003/0233805 A1 | * | 12/2003 | Horne | 52/712 |
| 2005/0005563 A1 | * | 1/2005 | Horne | 52/633 |
| 2007/0261340 A1 | * | 11/2007 | Cecilio et al. | 52/311.1 |

* cited by examiner

*Primary Examiner* — Kurt Fernstrom
*Assistant Examiner* — Dolores Collins
(74) *Attorney, Agent, or Firm* — Craig M. Stainbrook; Stainbrook & Stainbrook, LLP

(57) ABSTRACT

An adjustable pitch simulated roof for training firefighters in roof ventilation procedures. The apparatus includes a vertical support structure and a pitched roof portion adjustably connected to the vertical support structure. The pitched roof portion includes an outer frame defining an interior region, a plurality of rafter brackets disposed on the outer frame, a plurality of rafters placed the interior region, and a plurality of roofing sheets covering the rafters so as to form a roof field. A mechanical winch or other adjustment means are provided for rapidly and easily changing the roof pitch, and a locking mechanism locks the roof portion in the selected position. A stationary and a trailer-mounted mobile embodiment are each shown and described.

8 Claims, 10 Drawing Sheets

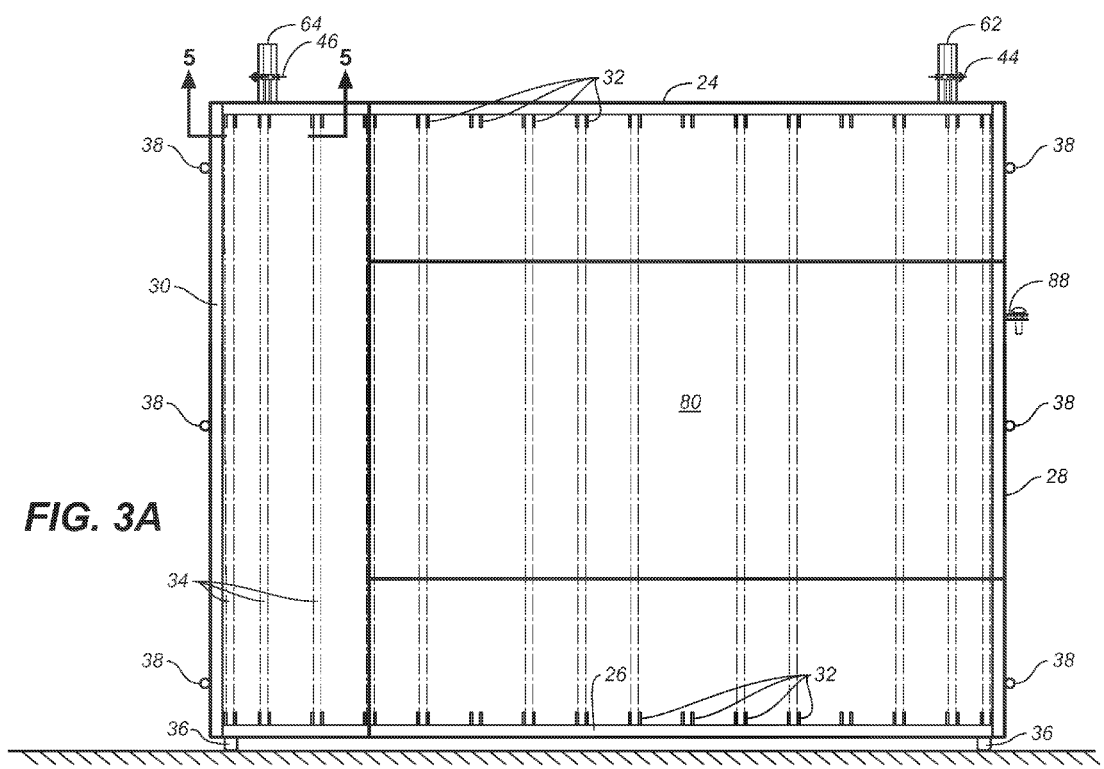

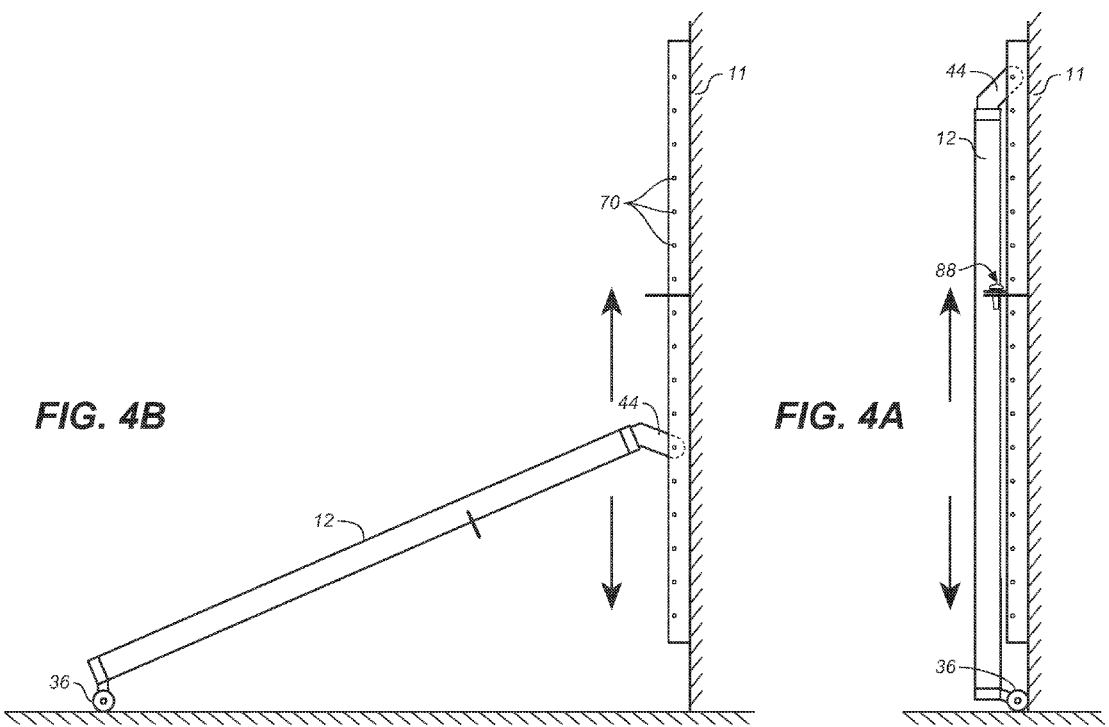

ADJUSTABLE PITCH SIMULATED ROOF FOR TRAINING FIREFIGHTERS IN ROOF VENTILATION PROCEDURES

CROSS REFERENCES TO RELATED APPLICATIONS

The present application claims the benefit of U.S. Provisional Patent Application Ser. No. 61/286,704, filed Dec. 15, 2009 (Dec. 15, 2009).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

SEQUENCE LISTING

Not applicable.

BACKGROUND OF THE INVENTION

1. Field of the Invention

The present invention relates generally to rescue worker training apparatus, and more particularly to firefighter training apparatus, and still more particularly to apparatus for training firefighters safe and effective roof ventilation procedures.

2. Discussion of Related Art Including Information Disclosed Under 37 CFR §§1.97, 1.98

In firefighting, roof ventilation is a procedure employed to create a draft with an opening above the firefighter entry point to the structure. It is created so that heat and smoke will be released up and out the vent. This is intended to help firefighters find and suppress the fire. Without such ventilation, a large fire can rapidly accumulate incompletely burned smoke, and this creates a danger of smoke explosions. Heat buildup can also give rise to a flashover danger. Accordingly, roof venting can be critical to the successful arrest of a large fire.

Ventilation can be accomplished in a number of ways. In some instances, the firefighter will find an existing opening in a structure—properly situated dormer windows, skylights, heating vents, and the like—and these structures can be employed to accomplish the venting. Additionally, a fire itself may create a vent by burning a hole in the roof in a process known as "auto-venting." But if a vent is called for and does not yet exist, the firefighter must create one by using a saw, such as a chain saw or a specialized tool for hole cutting. When performing the venting procedure, the safety of the procedure rests in part on cutting a hole in a portion of the roof that does not include load bearing rafters. If the firefighter inadvertently cuts through rafters, the roof may suffer an area collapse, imperiling the firefighter and any others who may be nearby.

Thus, it is imperative that firefighters be properly trained in safe roof ventilation procedures. This entails teaching the firefighter to detect and then to avoid cutting rafters while cutting holes in roof decking. As with all critical firefighting operations, it is woefully insufficient to have only an academic understanding of the process while not also having numerous direct practical experiences in ventilation operations. Thus, routine and repeated practice is required to ensure that firefighters will safely and effectively perform the procedure in real conditions. The challenge, of course, is in providing a practice environment that is itself safe, sufficiently realistic, and economical to use. The present invention addresses this need.

There are numerous prior art publications that describe simulated environments for firefighter training. Among them are U.S. Pat. No. 6,889,473, to Westra, which teaches a firefighter training building with a system of movable and removable partition walls for changing the interior floor plan layout of the building. The system uses tracks above the movable walls and movable and removable wall panels slidably mounted on the tracks.

U.S. Pat. No. 4,526,548, to Livingston, discloses a mobile firefighter training trailer. The trailer is divided into rooms and passages and includes simulated appliances and furniture pieces in the various rooms. A smoke generator is employed to supply smoke to selected locations in the trailer, and flame generating devices in the simulated appliances and furniture pieces create flames that can be extinguished with appropriate extinguishing agents. A ventilation system and sprinkler system are provided for the safety of the trainee.

U.S. Pat. No. 6,358,057, to Bishop, describes a firefighter training device for training a firefighter in proper window breaking and clearing techniques. It includes a frame, transparent impact resistant panels arranged in a coplanar orientation to fill the frame, and panel retaining assemblies to hold the panels in position. When the panels are struck, one of the panels breaks away as the panel retaining assembly releases that panel. The remaining panels are then struck to cause those panels to break away and to simulate the proper action of clearing the window after it has been initially broken. After the exercise is complete, the panels are restored to the frame so that the exercise can be repeated.

U.S. Pat. No. 6,877,988, to Phillips, et al, shows a door breach training system that includes a door and frame with replaceable shear pins designed to break under known pressures to simulate pressures required to breach doors of varying physical characteristics and lock configurations.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the inventive simulated adjustable pitch roof described and claimed herein.

BRIEF SUMMARY OF THE INVENTION

The present invention is an adjustable simulated pitched roof firefighter training apparatus having structural elements that may be rapidly removed and replaced with new elements when damaged during the training exercises. The apparatus may be installed as either a stationary structure or on a trailer for transport as a mobile training unit. The simulated pitched roof may be adjusted and secured in wide variety of pitches between and including a substantially horizontal configuration (generally used for parts replacement procedures) and a substantially vertical configuration (generally used for storage).

It is a principal object of the present invention to provide a new and improved firefighter training apparatus that gives firefighters a realistic "hands on" experience of cutting ventilation holes in a pitched roof.

It is another object of the present invention to provide firefighters the above-described training experience in a safe environment.

A further object of the present invention is to provide a new and improved firefighter roof ventilation training apparatus that simulated different roof pitches.

Still another object of the present invention is to provide a firefighter roof ventilation training apparatus that facilitates rapid replacement of components damaged in the training exercises.

Another object of the present invention is to provide a firefighter roof ventilation training apparatus that economizes on parts replacement costs by separating simulated rafters from roof panels such that rafters can be replaced individually as needed, and without the need to dismantle connected parts.

A still further object of the present invention is to provide a firefighter roof ventilation training apparatus with structural elements that give the trainee the actual "feel" of cutting through roofing materials, thereby learning to detect the feel of rafters so as to avoid cutting load bearing structures and to prevent area collapse.

Yet another object of the present invention is to provide a firefighter roof ventilation training apparatus that folds flat for storage against a wall in a permanent installation or flat on a trailer bed for transport in a mobile unit.

An even further object of the present invention is to provide a novel firefighter roof ventilation training apparatus that can be installed at and on any of a number of structures commonly found at fire stations, including a drill training tower, a station house wall, or even between vertical support poles in a parking lot.

Other novel features characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention.

Accordingly, the foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 3A is a front elevational view of the roof platform as it would appear in a stored upright condition (i.e., against a wall when not in use)

FIG. 4A is a side elevational view of the apparatus of FIG. 3A;

FIG. 4B is a side elevational view of the apparatus of FIG. 3B in a slightly elevated (pitched or angled) configuration;

DETAILED DESCRIPTION OF THE INVENTION

Figure 1:
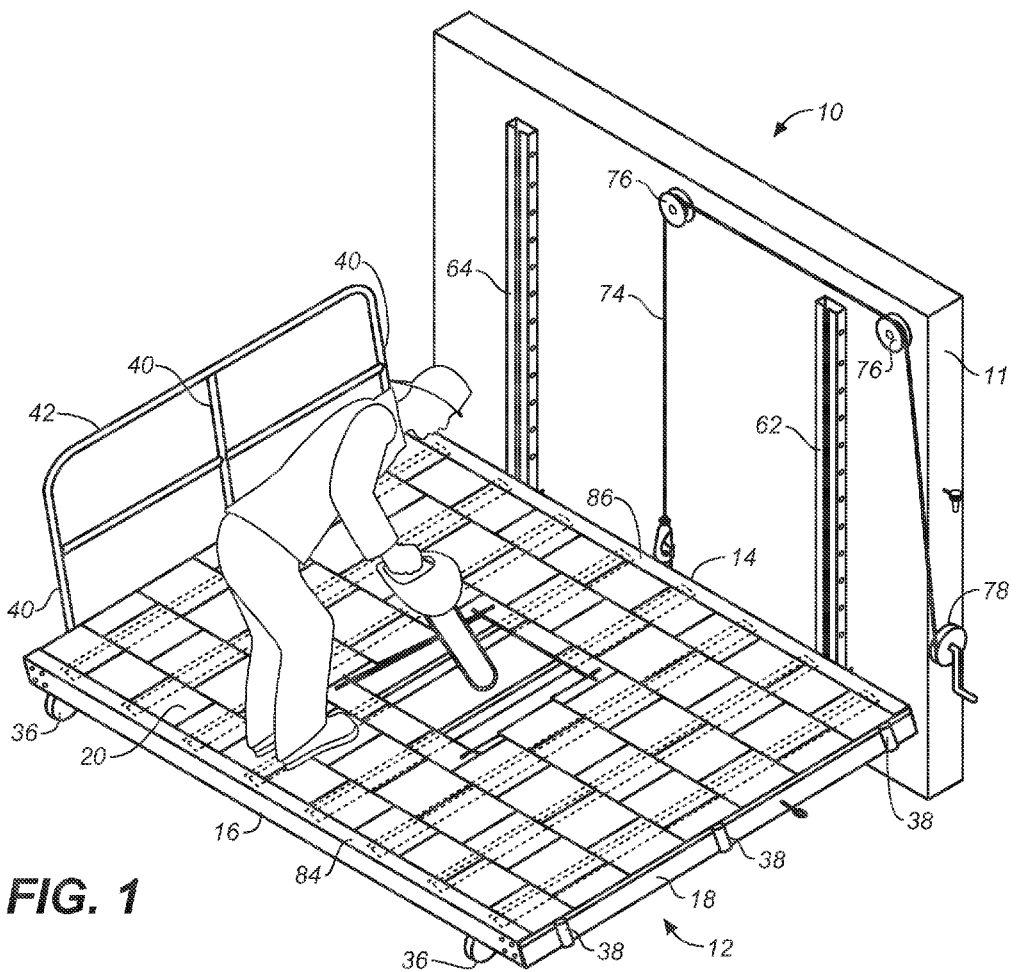
FIG. 1 is an overall upper perspective view of the firefighter roof ventilation training apparatus of the present invention, showing an optional handrail on one side.
Figure 1A:
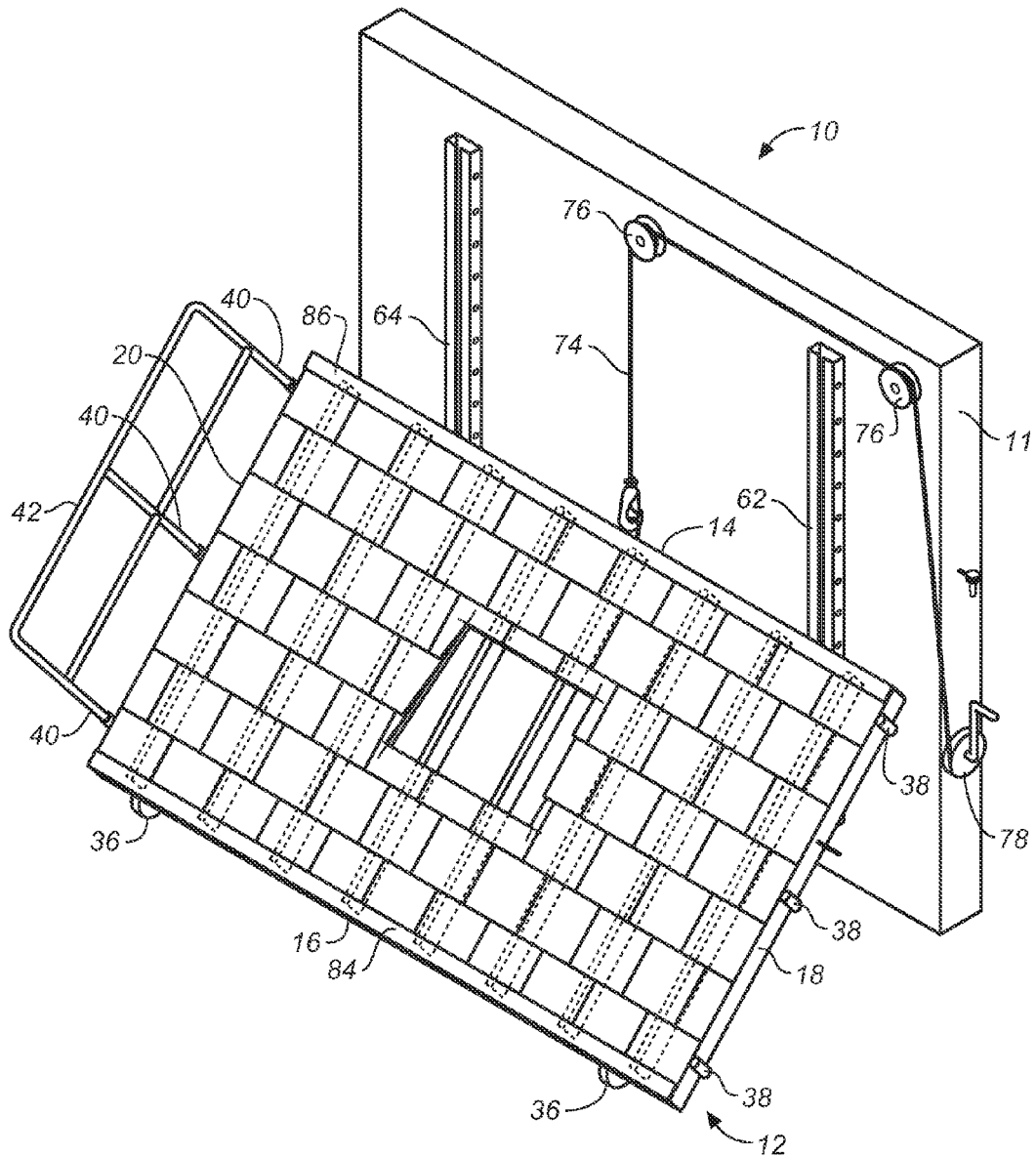

Referring first to FIG. 1 through FIG. 8, wherein like reference numerals refer to like components in the various views, there is illustrated therein a new and improved adjustable simulated pitched roof firefighter roof ventilation training apparatus, generally denominated 10 herein. These views collectively show that in a first preferred embodiment the inventive apparatus comprises a vertical support 11, which may be a wall (as shown) or any sufficiently sturdy vertically oriented structure. The wall or support may comprise part of an existing structure, or it may be free standing and structurally independent of any other structure. Moreover, the support may comprise spaced apart vertical columns or posts permanently sunk into ground and cemented or secured to the ground with nuts and bolts. The principal purpose of the vertical support is to provide a structure onto which an adjustably pitched planar surface can be hung, as described below.

The system next includes a generally planar adjustable pitched roof portion 12 comprising a top side 14, a bottom side 16, a right side 18, and a left side 20. A rectangular steel frame 22 defines the roof area, which possesses a corresponding geometry. It thus includes a top frame member 24, a bottom frame member 26, a right frame member 28, and a left frame member 30. Disposed on the interior surfaces of the top and bottom frame members are a plurality of U-shaped rafter brackets 32 or hangers for hanging wood rafters 34 at each of their ends. The rafter brackets may be provided with holes for inserting screws or pins to secure the rafters, though it is preferred that the rafters simply be placed loosely and unsecured in the bracket such that they can be removed without the need of tools. It will be appreciated that the top side and bottom side functionally and effectively replace what would be the ridge board and fascia of a conventional house roof, but these elements are not typically involved in a venting operation so their provision in wood is not called for.

Welded or otherwise secured to the bottom frame member are casters 36 which permit the bottom frame member of the roof portion to roll toward and away from the vertical supports as the pitch of the roof is changed in relation to the vertical support by a pitch adjusting mechanism, described below.

For safety, in the preferred embodiments, the right and left frame members are provided with a plurality of vertically oriented cylindrical or square receptacles 38 for removably inserting the vertical square or cylindrical tubes or posts 40 of safety fences 42. Accordingly, as steeper pitches are tackled in training sessions, the safety rails provide a measure of security appropriate to the training, rather than real world, environment.

The roof portion next includes roller assemblies 44, 46 welded to the top frame member. Roller assemblies each comprise a stem 50 with an axle 56 disposed proximate the outer end 58 of the stem, and rollers 60 mounted on the axles at each side of the stem. The rollers are set in tracks, such as box channels 62, 64 (open seam square or open seam rectangular tubing), attached to the vertical support in a vertical orientation. The box channels include a continuous seam or slot 66, 68 which accommodates the roller stems and the rollers are thereby capable of free vertical movement in only the up and down directions. The channels also include a plurality of linearly arrayed stop holes 70 for the insertion of a removable stop pin 72 below the rollers so as to fix the pitch of the roof portion at a selected and predetermined height and angle and to prevent any change of pitch while in use.

As can be seen principally by reference to FIGS. 1-1A, and 4A-4B, to facilitate easy adjustments in pitch, the roof portion is connected on its top side to one end of one or more cables 74, which is/are then disposed over one or more pulleys 76 and connected at its other end to a winch 78 (either motorized or manual). Changing pitch entails taking up any slack in the cable and bearing the load of the tilted roof at the winch. Any stop pins are removed from channel stop holes and the pitch is adjusted up or down using the winch. When the new pitch is achieved, stop pins are placed in holes under the rollers and any excess tension on the cable is released at the winch.

Figure 2A:
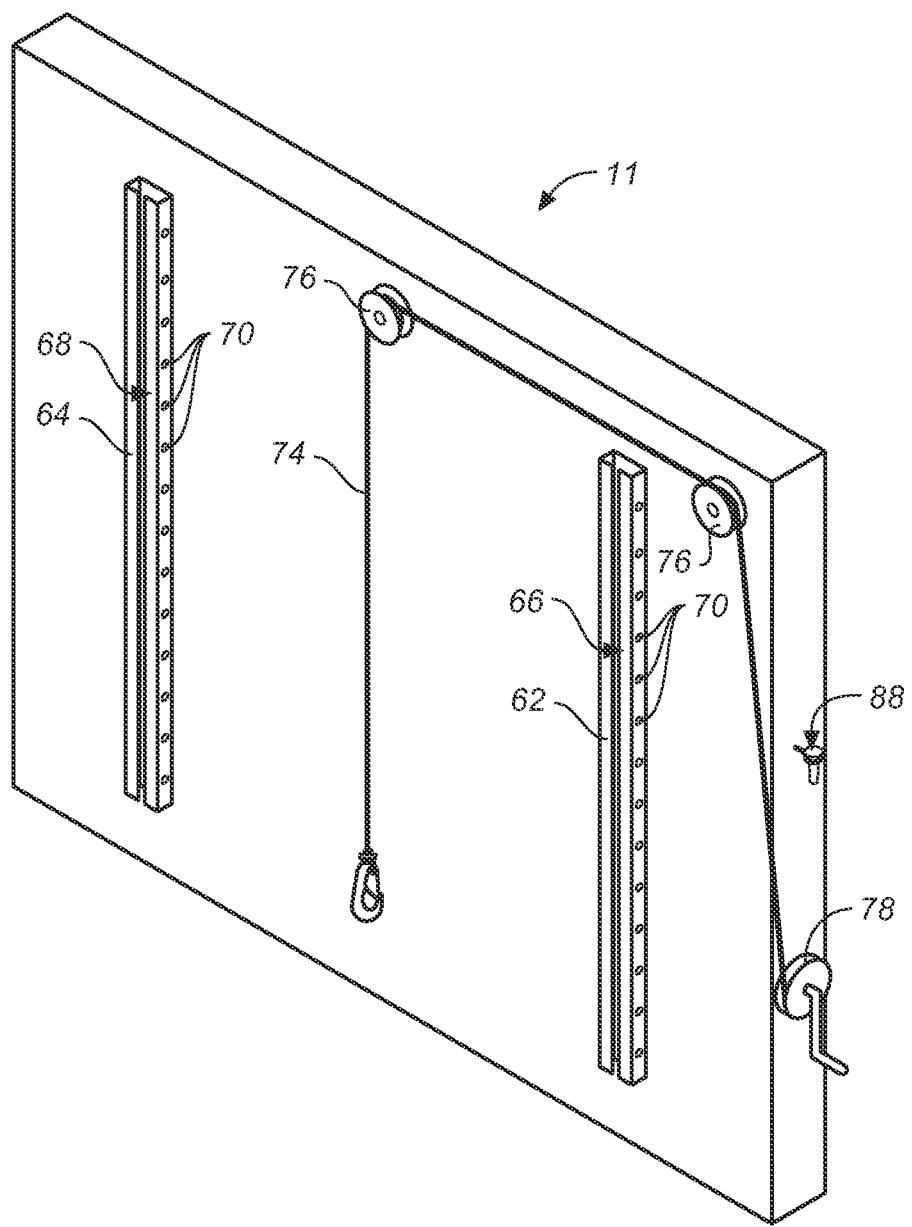
FIG. 2A is a perspective view of the wall system employed with the system showing a lift mechanism.
Figure 2B:
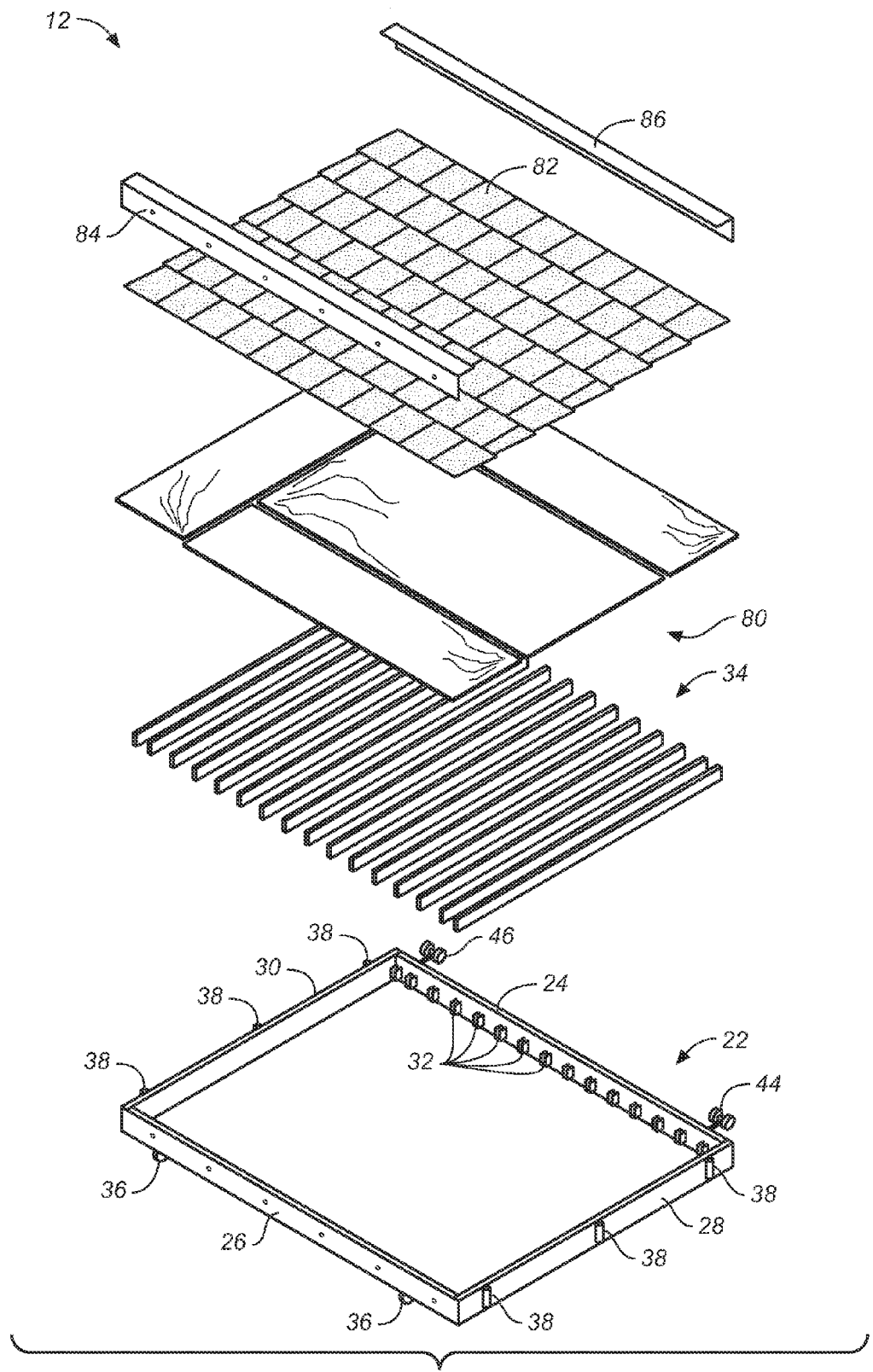
FIG. 2B is an exploded perspective view of the roof platform.
Figure 3B:
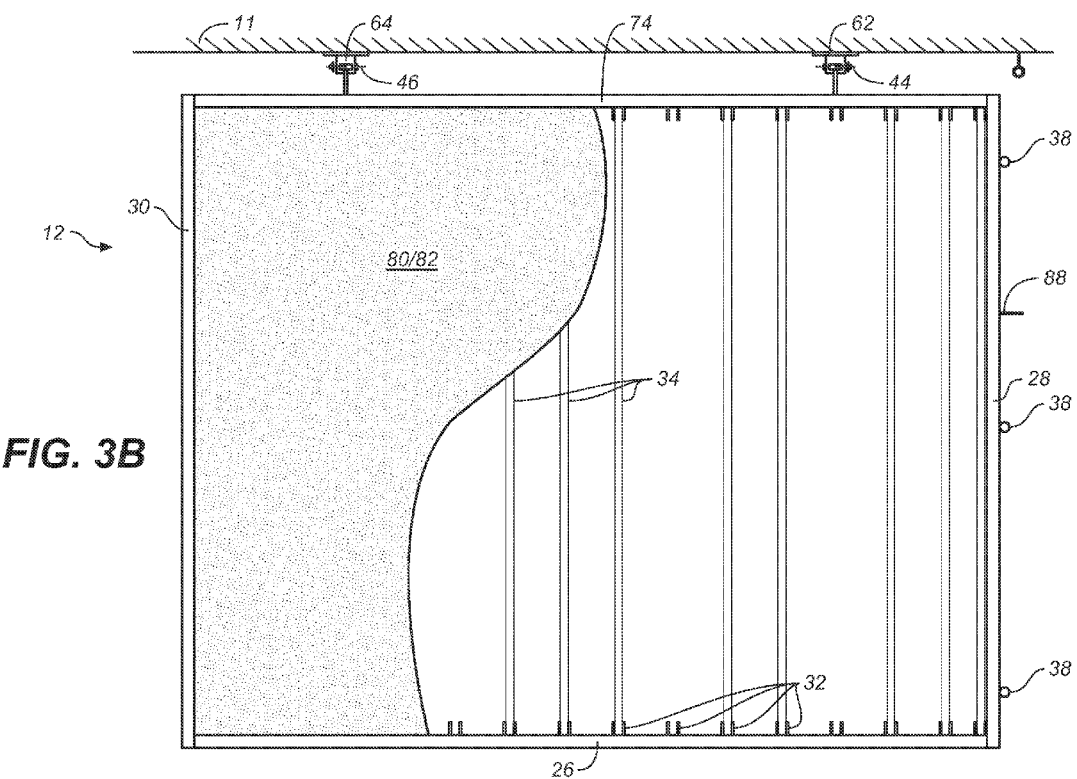
FIG. 3B is a top plan view of the roof platform after it has been lowered to a generally horizontal position for preparing the roof for use.
Figure 5:
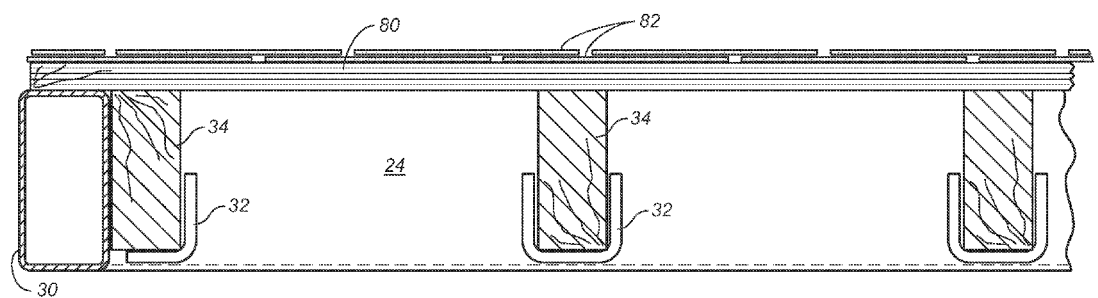
FIG. 5 is a cross-sectional top or bottom detail view of the platform frame showing sacrificial rafters.
Figure 6A:
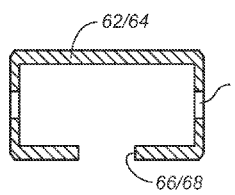
FIG. 6A is a top sectional view of a guide rail.
Figure 6B:
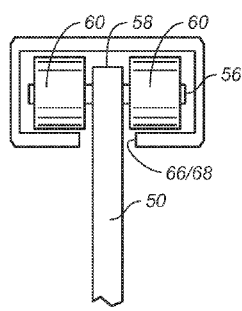
FIG. 6B is a top plan view of a guide rail showing the platform attachment arm with rollers.
Figure 7:
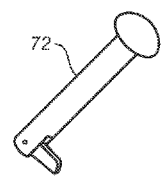
FIG. 7 is a perspective view of a representative loop and pin device for holding the platform in an upright storage position.
Figure 8:
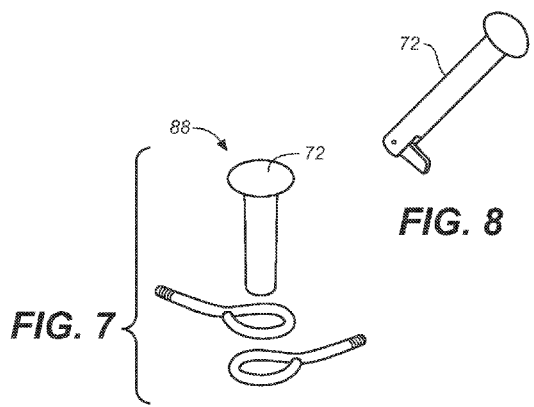
FIG. 8 is a representative pin for use in locking the platform into a specific position.

Referring now to FIG. 2B, there is shown an exploded view of the roof portion of the inventive system. Here can be seen the structural elements comprising the roof portion. As indicated above, the frame 22 includes U-shaped brackets on the interior sides of its top frame member and bottom frame member, 24 and 26, respectively. The ends of the rafters 34 are placed in the brackets. (Rafter spacing is preferably at least slightly unpredictable. This will require the trainee to detect the presence of supporting rafters as he or she is executing the venting procedure.) After placement of the rafters, plywood panels 80 are placed over the rafters in the manner of solid decking roof sheets and in any configuration that facilitates rapid removal and replacement. Shingles 82 are then added to provide a close real-world simulation and to hide seams that might give the trainee clues as to the rafter locations. (If an even closer simulation is sought, felt underlayment may be placed, though the absence or presence of the felt underlayment has not been shown to contribute in a meaningful way to venting training.) The panels are then secured at the top and bottom sides of the frame with L-shaped flanges 84, 86, that rapidly bolt onto the frame members.

Preferably, the panels are secured with very few screws to the rafters. Accordingly, if a trainee inadvertently cuts all or a portion of a rafter when venting the roof portion, the affected rafters can be replaced simply by removing any screws or nails that may be securing the affected panel and then removing the affected panel off, replacing the rafter, and then replacing the panel and shingle finish.

When in the upright storage configuration, a lock 88 may be employed to ensure that the roof portion does not disengage from the vertical supports and pitch downward. The lock may be as simple as two bracket elements provided with aligned through holes for the insertion of a locking pin.

Figure 9:
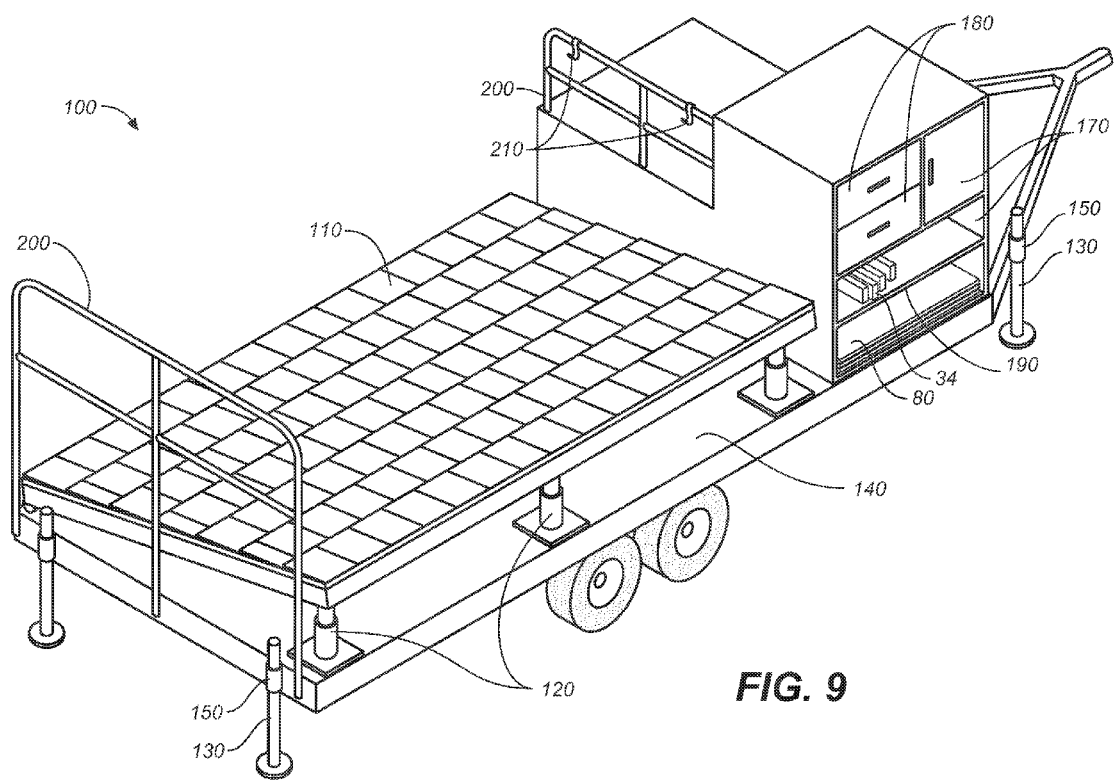
FIG. 9 is an upper rear perspective view of a second preferred embodiment of the present invention, namely a firefighter roof ventilation training apparatus installed on a mobile trailer.

Referring next to FIG. 9, in a second preferred embodiment 100, the adjustable pitched roof is mounted on a mobile flat bed trailer 110. This embodiment provides fire department jurisdictions having multiple station houses the option of purchasing a single trailer unit that can be moved among the station houses for training days, rather than providing a stationary unit at multiple locations or at a single location to which remote trainees must then travel. In this embodiment, the adjustment mechanism may be provided by one or more hydraulic lifts 120 (such as telescopic hydraulic cylinders or other powered lifts) that elevate the roof portion without the need for vertical supports. In the alternative, the trailer may be provided with vertical supports pivotally attached to the trailer bed at their base that may be deployed into an upright position and then locked into position. Other kinds of removable supports may be provided that facilitate laying the supports substantially flat on the trailer bed surface until they need to be secured in an upright position and then installed in a suitably sturdy support receptacle. If a lift mechanism other than hydraulic pistons is provided, such as the winch system employed in the permanent installation described above, the vertical supports are then also provided with open seam square box channels 160, as in the first preferred embodiment, and the roof portion is similarly provided with complementary operational structure, e.g., roller assemblies. If pivotally secured at their base, the vertical supports need only be swung into a preselected angled position and locked. If not secured at their base, they may be coupled or inserted into a receptacle or other support element and locked in place. In every other respect, the structure and operation is essentially identical to that of the stationary unit.

Lateral stability can be enhanced by providing the trailer feet 130 adjustably depending from sleeves 150 in a well known manner. The trailer can also be provided with variously sized storage bays 170, drawers 180, shelves 190, and fencing 200 with hanging brackets 210 for the storage and ready provision of plywood panels, shingles, rafters, chainsaws, handrails, safety harnesses, climbing rope, and every other item of equipment and accouterment required for training and safety.

Figure 10A:
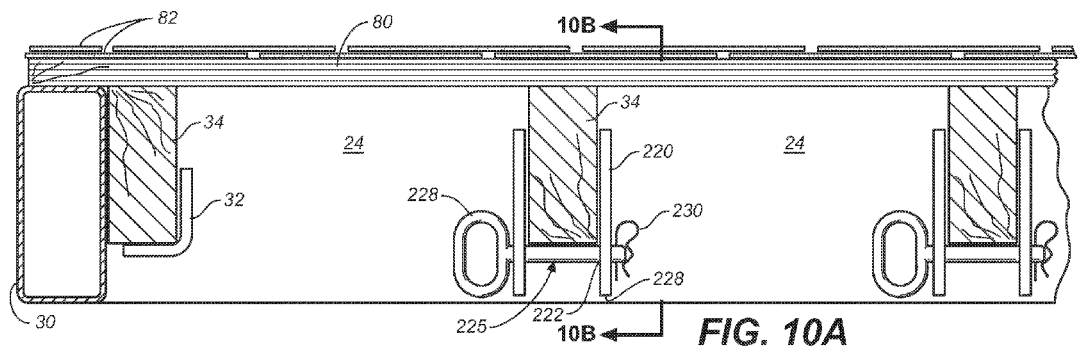
FIG. 10A is a top end view in elevation showing an alternative frame structure for holding rafters in the present invention.
Figure 10B:
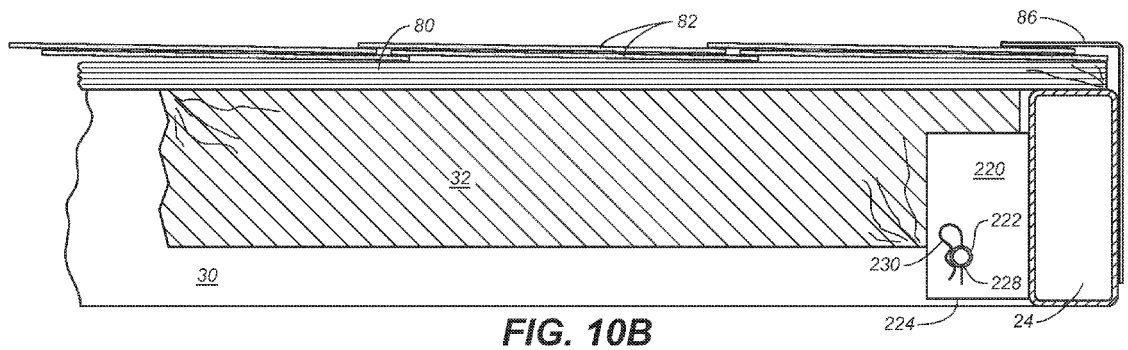
FIG. 10B is a cross-sectional side view in elevation taken along section line 10B-10B of FIG. 10A.

FIGS. 10A-10B shows an alternative frame structure that may be employed in either of the first or second embodiments of the present invention. The brackets in this alternative replace U-shaped supports for the rafters with spaced-apart parallel plates 220, each with through holes 222 proximate their bottom ends 224 through which a clevis pin 225 can be inserted. The clevis pin 225 provides the base support for the rafters and includes a handle 226 for rapid removal. The clevis pin includes an end hole 228 for the insertion of a spring-type split pin 230 to secure the clevis pin until removal is desired. In this way, an unsecured and damaged rafter can be removed from the underside of the assembly without removing any of the panels or simulated roof covering materials (underlayment, shingles, and so forth).

From the foregoing, therefore, it will be clear that in its most essential aspect, the present invention is an adjustable pitch simulated roof for training firefighters in roof ventilation procedures, and includes at least one vertical support; a pitched roof portion adjustably connected to the vertical support(s), wherein the pitched roof portion has a frame defining an interior region which is filled with conventional structural elements. It accomplishes this by providing a number of rafter brackets disposed on the interior sides of frame members for loosely hanging rafters in the interior space. Decking sheets are placed over and cover the rafters to form a field of roof in which the training operations take place. Pitch angles can be changed using a mechanical adjustment mechanism, and a locking mechanism locks the pitched roof portion in position.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An adjustable pitch simulated roof for ventilation procedure training, comprising:
    a vertical support;
    a roof frame;
    a plurality of rafter supports installed on said roof frame; and
    a pitch adjustment mechanism operatively connected to said roof frame;
    wherein said roof frame is metal and includes a top frame member, a bottom frame member, a right frame member, and a left frame member, said frame members connected so as to define a square or rectangular roof field; and
    wherein said bottom frame member includes wheels that facilitate translation across a surface toward and away from said vertical support as the pitch of said roof is changed in relation to said vertical support by said pitch adjustment mechanism.

2. The apparatus of claim 1, wherein said right and left frame members each include spaced apart vertically oriented receptacles and a safety fence having vertical columns inserted into said receptacles.

3. The apparatus of claim 2, further including at least one roller assembly disposed on said top member of said roof frame.

4. The apparatus of claim 3, further including a vertically oriented track disposed on said vertical support in which a roller of said roller assembly moves when the pitch of said roof frame is adjusted, and wherein said track includes locking apparatus to maintain said roller at a predetermined elevation and thereby to fix the pitch of said simulated roof.

5. The apparatus of claim 1, wherein said pitch adjustment mechanism comprises a winch connected to said roof frame via a cable disposed through at least one pulley.

6. The apparatus of claim 1, wherein said vertical supports are disposed on a mobile trailer.

7. An adjustable pitch simulated roof for ventilation procedure training, comprising:
    a vertical support;
    a metal roof frame; a plurality of rafter supports installed on said roof frame; and a pitch adjustment mechanism operatively connected to said roof frame;
    wherein said vertical support is disposed on a mobile trailer:
    and wherein said adjustment mechanism comprises hydraulic lifts operatively connected to said metal roof frame.

8. An adjustable pitch simulated roof for
ventilation procedure training, comprising: a vertical support;
    a metal roof frame; a plurality of rafter supports installed on said roof frame; and a pitch adjustment mechanism operatively connected to said roof frame;
    wherein said vertical support is disposed on a mobile trailer;
    and wherein said adjustment mechanism is a winch operatively connected to said metal roof frame.

* * * * *